May 6, 1958
V. L. PATTON
2,833,017
HOOK GUARD
Filed April 3, 1956
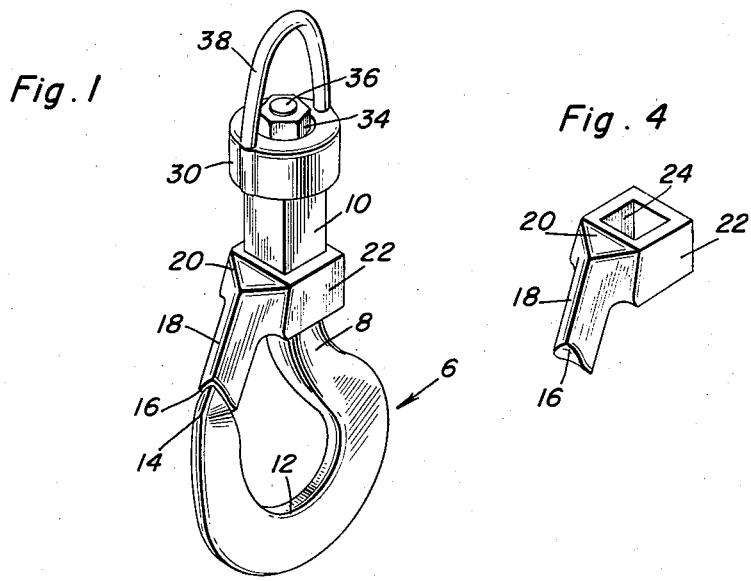
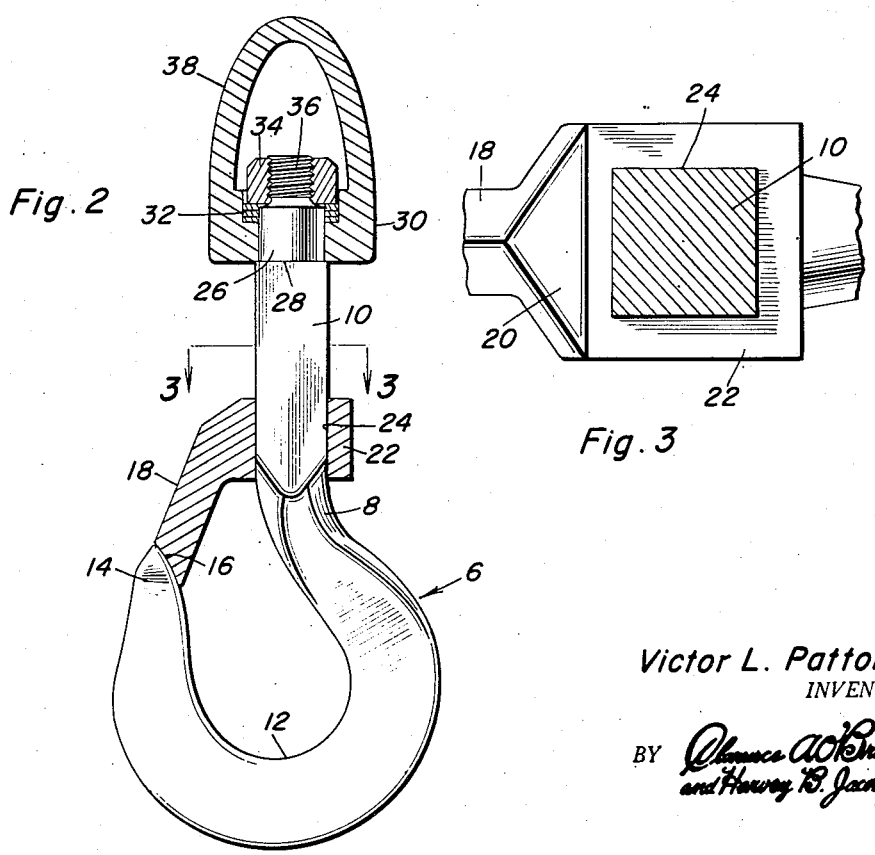
Victor L. Patton
INVENTOR.

United States Patent Office 2,833,017
Patented May 6, 1958

2,833,017

HOOK GUARD

Victor L. Patton, Silver City, N. Mex.

Application April 3, 1956, Serial No. 575,901

1 Claim. (Cl. 24—238)

The present invention relates to a structurally improved hook, for example, a heavy duty hoisting hook and has reference in particular to a readily applicable and removable keeper which is mounted on the shank of the hook and functions as a guard and thus prevents accidental opening of the hook.

Hooks in the category of invention under consideration are usually, perhaps loosely, referred to as snap-hooks and the like. Generically, it is common in the art to provide a hook at one end of a shank with the hook terminating in a bill and the bill spaced from the shank to define a mouth or entrance. Various types of guards and keepers are mounted on the shank and bridge the entrance or mouth when the hook is closed and thus guards the same against accidental release from the hoisting cable or other element which is connected with the hook. On the upper end of the shank there is an eye to which the hoisting cable or equivalent part is connected.

The object of this invention is to structurally and functionally improve upon similarly constructed and performing so-called snap-hooks. Looking toward this end the shank is non-circular, preferably square, in cross-section and the exposed surfaces are smooth-finished. A keeper or guard which is here used to bridge the mouth of the hook is sturdy and rigid and carried by a collar with an opening corresponding to the cross-section of the shank, said collar being of considerable mass, relatively speaking, and being freely slidable in an up direction for releasing and serving to drop down by gravity under its own weight when so intended by the user.

Another object of the invention is to provide a hook wherein the upper end of the shank is reduced and cylindrical in cross-section to provide for the mounting thereon of a rotatable eye carrying a rigid clevis, the eye being held in place by a conventional nut on an adjacent screw threaded terminal portion of the shank.

Other objects, features and advantages will become more readily apparent from the following description and the accompanying sheet of illustrative drawings.

In the drawings, wherein like numerals are employed to designate like parts throughout the views:

Figure 1 is a perspective view of a hook constructed in accordance with the principles of the present invention;

Figure 2 is an enlarged view with parts in section and elevation;

Figure 3 is an exaggerated section on the line 3—3 of Figure 2 looking in the direction of the arrows; and Figure 4 is a perspective view of the freely slidable gravity-type self-latching guard or keeper.

Referring now to the drawings with the aid of reference numerals the hook proper is denoted by the numeral 6 and is of usual J-shaped form, the shank 8 thereof joining the axially disposed suspension shank 10 at the desired off-set angle. The seat portion 12 is in approximate axial alignment with the axis of the suspension shank 10. For convenience the shank 10 may be called the main shank and the companion portion 8 the junctional shank between it and the hook 6. The free or terminal end of the hook is referred to as the bill or beak 14 and it is slightly pointed to cooperate and nest itself with a terminal notch or seat 16 in the free end of the rigid keeper or guard 18. The latter is connected at its upper end by a sturdy junctional portion 20 with one side of the square collar 22. That is to say, the collar is square externally and also has an internal square opening 24 which fits snugly but slidably on the smooth-surfaced shank 10. The collar rides or slides up and down on the shank and it in conjunction with the guard is of sufficient mass or weight that it drops down under the forces of gravity and hence the keeper may be said to be self-latching. The upper end of the shank 10 is reduced and cylindrical in cross-section as at 26 to provide a shoulder 28 and the ring like eye 30 is provided and is mounted for rotation and the reduced cylindrical portion or journal 26, is provided with shims or washers 32 and held in place by an assembling and clamping nut 34 carried by the upper screw-threaded end 36 of the shank. The eye is provided with an integral U-shaped portion 38 which may be described as a clevis. In fact the parts 30 and 38 provide a swivelly mounted clevis or suspension eye for the complete hook construction.

In this construction there are no recesses, pockets or special latches on the main shank 10 to weaken it in any manner whatsoever. Whereas in some prior art devices it takes both hands to operate the over-all hook construction it will be noted that the present construction is such that the guard or keeper is self-latching.

Briefly summarized it is to be noted that the shank 10 is solid and that the safety guard is of heavy duty construction, gravity-lowered, and self-latching. There are no grooves or cut-outs in the shank to weaken the same. There are no springs or triggers or extraneous parts to wear out or to require repair. The hook can be opened with one hand leaving the other hand free. The hook is a "safety" hook at all times. When the guard is released the hook automatically becomes a safety hook. The surface portions of the hook and complemental parts are so smooth and uniform that there is little likelihood of any part of the hook hanging on nearby or adjacent objects.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A heavy duty snap-hook for hoisting and other working requirements comprising a stout rigid solidly smooth-finished non-corrodible shank uniformly non-circular in cross section and having a swivelly mounted line attaching clevis on its upper end and a rigid hook on its lower end, said hook terminating in a bill portion, a relatively heavy non-circular snug-fitting collar embracing and freely slidable both up and down on said shank and provided on one side with an integral depending oblique angled guard, said guard being located in alignment with, and movable toward and from, and being cooperable with, the bill portion of said hook to bridge the space between the bill portion and shank, and to function as a gravity actuatable self-closing latch, said collar being interiorly smooth-finished and capable of sliding up and down on the shank in a substantially frictionless manner, the surfaces of said shank being wholly smooth and uninterruptedly flat, said guard being substantially triangular in cross-section, and the lower tip thereof having a terminal notch providing a seat for effectual cooperation with the tip of said bill portion.

References Cited in the file of this patent

UNITED STATES PATENTS

| | | |
|---|---|---|
| 219,677 | Blakeman | Sept. 16, 1879 |
| 354,481 | McKay | Dec. 14, 1886 |
| 721,801 | Hooker | Mar. 3, 1903 |
| 1,394,064 | Cousins | Oct. 18, 1921 |
| 1,522,831 | O'Bannon | Jan. 13, 1925 |
| 1,534,879 | Stewart | Apr. 21, 1925 |
| 1,707,721 | Hoffman | Apr. 2, 1929 |